United States Patent
Kresnyak et al.

(10) Patent No.: US 7,341,102 B2
(45) Date of Patent: Mar. 11, 2008

(54) FLUE GAS INJECTION FOR HEAVY OIL RECOVERY

(75) Inventors: Steve Kresnyak, Calgary (CA); Gary Bunio, Calgary (CA)

(73) Assignees: Diamond QC Technologies Inc., Calgary, Alberta (CA); Colt Engineering Corporation, Calgary, Alberta (CA); Paramount Resources Ltd., Calgary, Alberta (CA)

(*) Notice: Subject to any disclaimer, the term of this patent is extended or adjusted under 35 U.S.C. 154(b) by 160 days.

(21) Appl. No.: 11/116,292

(22) Filed: Apr. 28, 2005

(65) Prior Publication Data
US 2006/0243448 A1 Nov. 2, 2006

(51) Int. Cl.
E21B 43/18 (2006.01)
E21B 43/24 (2006.01)
E21B 43/34 (2006.01)

(52) U.S. Cl. .............. 166/267; 166/266; 166/272.1; 166/272.3; 166/272.7; 166/303

(58) Field of Classification Search ........... 166/75.12, 166/266, 267, 272.1, 272.3, 272.7, 303, 305.1, 166/306
See application file for complete search history.

(56) References Cited

U.S. PATENT DOCUMENTS

| 3,396,537 | A | 8/1968 | Lissant et al. ............... 60/216 |
| 3,409,420 | A | 11/1968 | Booth et al. ..................... 44/4 |
| 3,409,560 | A | 11/1968 | Faust et al. ................. 252/309 |
| 3,458,294 | A | 7/1969 | Nixon et al. ................... 44/51 |
| 3,490,237 | A | 1/1970 | Lissant ......................... 60/217 |
| 3,527,581 | A | 9/1970 | Brownawell et al. .......... 44/51 |
| 3,539,406 | A | 11/1970 | Lissant ....................... 149/109 |
| 3,540,866 | A | 11/1970 | Miller ........................... 44/51 |
| 3,547,605 | A | 12/1970 | Cornelius, III et al. .......... 44/4 |
| 3,548,938 | A * | 12/1970 | Parker ........................ 166/256 |
| 3,606,868 | A | 9/1971 | Voogd ..................... 125/25 R |
| 3,615,290 | A | 10/1971 | Nixon et al. ................... 44/51 |
| 3,617,095 | A | 11/1971 | Lissant et al. ................ 302/66 |
| 3,637,357 | A | 1/1972 | Nixon et al. ................... 44/51 |

(Continued)

FOREIGN PATENT DOCUMENTS

WO    WO 99/64719 A2    12/1999

(Continued)

OTHER PUBLICATIONS

Mitsubishi Heavy Industries, Ltd.; Masaki Iijima and Takashi Kamijo "Flue Gas CO2 Recovery and Compression Cost Study for CO2 Enhanced Oil Recovery"; Oct. 2002.

(Continued)

Primary Examiner—George Suchfield
(74) Attorney, Agent, or Firm—Paul S. Sharpe; Ogilvy Renault LLP

(57) ABSTRACT

A variety of methods for thermal recovery of natural gas and bitumen from a formation containing the latter. In general, the methods incorporate a series of existing, but previously uncombined technologies. A modified flue gas from the steam generators conventionally used in a SAGD recovery operation is injected into the formation to enhance recovery with the produced fluids, natural gas, bitumen, inter alia are further processed. The injection of the flue gas conveniently is disposed of and further acts to repressurize the formation which otherwise becomes depressurized when depleted of natural gas. Accordingly, environmental and economic advantages are realized with the methodology.

26 Claims, 9 Drawing Sheets

U.S. PATENT DOCUMENTS

| | | | |
|---|---|---|---|
| 3,642,608 A | 2/1972 | Roach et al. | 208/8 |
| 3,658,302 A | 4/1972 | Duthion et al. | 259/18 |
| 3,672,853 A | 6/1972 | Reman et al. | 44/52 |
| 3,709,747 A | 1/1973 | Nixon et al. | 149/22 |
| 3,732,084 A | 5/1973 | Nixon et al. | 44/51 |
| 3,743,486 A | 7/1973 | Franciscovich | 44/51 |
| 3,743,555 A | 7/1973 | Seaman | 149/36 |
| 3,756,794 A | 9/1973 | Ford | 44/51 |
| 3,764,547 A | 10/1973 | Schlinger et al. | 252/184 |
| 3,816,329 A | 6/1974 | Kenney et al. | 252/312 |
| 3,846,086 A | 11/1974 | Balch et al. | 44/40 |
| 3,849,323 A | 11/1974 | Hollinshead | 252/56 R |
| 3,853,497 A | 12/1974 | Miller et al. | 44/62 |
| 3,876,391 A | 4/1975 | McCoy et al. | 44/51 |
| 3,902,869 A | 9/1975 | Friberg et al. | 44/51 |
| 3,907,134 A | 9/1975 | Metzger | 44/51 |
| 3,908,762 A | 9/1975 | Redford | 166/263 |
| 3,915,970 A | 10/1975 | Limaye et al. | 260/248 |
| 4,008,924 A | 2/1977 | Gogarty et al. | 302/66 |
| 4,011,843 A | 3/1977 | Feuerman | 123/119 |
| 4,014,575 A * | 3/1977 | French et al. | 299/2 |
| 4,029,360 A * | 6/1977 | French | 299/2 |
| 4,030,894 A | 6/1977 | Marlin et al. | 44/51 |
| 4,061,473 A | 12/1977 | Norris | 44/51 |
| 4,069,022 A | 1/1978 | Metzger | 44/51 |
| RE29,553 E * | 2/1978 | Burton et al. | 299/2 |
| 4,074,978 A | 2/1978 | Panzer | 44/62 |
| 4,082,516 A | 4/1978 | Metzger | 44/551 |
| 4,083,698 A | 4/1978 | Wenzel et al. | 44/51 |
| 4,084,940 A | 4/1978 | Lissant | 44/51 |
| 4,089,657 A | 5/1978 | Keller | 44/51 |
| 4,101,293 A | 7/1978 | Krause et al. | 44/51 |
| 4,115,313 A | 9/1978 | Lyon et al. | 252/309 |
| 4,116,610 A | 9/1978 | Berthiaume | 431/4 |
| 4,121,995 A | 10/1978 | Hsu | 208/8 |
| 4,127,138 A | 11/1978 | Sweeney | 137/13 |
| 4,130,400 A | 12/1978 | Meyer | 44/51 |
| 4,130,401 A | 12/1978 | Meyer et al. | 44/51 |
| 4,147,519 A | 4/1979 | Sawyer, Jr. | 44/51 |
| 4,149,854 A | 4/1979 | Kohn | 44/51 |
| 4,149,855 A | 4/1979 | Kohn et al. | 44/51 |
| 4,153,421 A | 5/1979 | Marlin | 44/51 |
| 4,156,434 A | 5/1979 | Parker et al. | 137/13 |
| 4,158,551 A | 6/1979 | Feuerman | 44/51 |
| 4,162,143 A | 7/1979 | Yount, III | 44/51 |
| 4,163,644 A | 8/1979 | Bowers | 44/51 |
| 4,165,969 A | 8/1979 | Hughes et al. | 44/51 |
| 4,171,957 A | 10/1979 | Moriyama et al. | 44/51 |
| 4,173,455 A | 11/1979 | Fodor et al. | 44/51 |
| 4,177,039 A | 12/1979 | Sakuma et al. | 44/51 |
| 4,182,613 A | 1/1980 | Stover et al. | 44/51 |
| 4,182,614 A | 1/1980 | Moriyama et al. | 44/51 |
| 4,187,078 A | 2/1980 | Shimizu et al. | 44/51 |
| 4,195,975 A | 4/1980 | Hamuro et al. | 44/51 |
| 4,199,326 A | 4/1980 | Fung | 44/51 |
| 4,201,552 A | 5/1980 | Rowell et al. | 44/51 |
| 4,203,728 A | 5/1980 | Norton | 44/51 |
| 4,203,729 A | 5/1980 | Ishizaki et al. | 44/51 |
| 4,208,251 A | 6/1980 | Rasmussen | 201/14 |
| 4,218,221 A | 8/1980 | Cottell | 44/51 |
| 4,244,700 A | 1/1981 | Chukhanov et al. | 44/1 R |
| 4,244,702 A | 1/1981 | Alliger | 44/51 |
| 4,246,000 A | 1/1981 | Kobayashi et al. | 44/51 |
| 4,251,229 A | 2/1981 | Naka et al. | 44/51 |
| 4,251,230 A | 2/1981 | Sawyer, Jr. | 44/51 |
| 4,252,540 A | 2/1981 | Yamamura et al. | 44/51 |
| 4,266,943 A | 5/1981 | Lo | 44/51 |
| 4,272,253 A | 6/1981 | Schulz et al. | 44/51 |
| 4,276,054 A | 6/1981 | Schmolka et al. | 44/51 |
| 4,288,232 A | 9/1981 | Schmolka et al. | 44/51 |
| 4,291,720 A | 9/1981 | Folland | 137/209 |
| 4,293,312 A | 10/1981 | Fox | 44/1 R |
| 4,293,313 A | 10/1981 | Fox | 44/1 R |
| 4,295,859 A | 10/1981 | Boehmke | 44/51 |
| 4,297,107 A | 10/1981 | Boehmke | 44/51 |
| 4,304,573 A | 12/1981 | Burgess et al. | 44/51 |
| 4,305,729 A | 12/1981 | Stearns | 44/51 |
| 4,306,881 A | 12/1981 | Stearns | 44/51 |
| 4,306,882 A | 12/1981 | Stearns | 44/51 |
| 4,306,883 A | 12/1981 | Eckman | 44/51 |
| 4,309,191 A | 1/1982 | Hiroya et al. | 44/51 |
| 4,309,269 A | 1/1982 | Denker et al. | 208/8 LE |
| 4,315,755 A | 2/1982 | Hellsten et al. | 44/51 |
| 4,332,593 A | 6/1982 | Burgess et al. | 44/51 |
| 4,339,246 A | 7/1982 | Yamamura et al. | 44/51 |
| 4,347,061 A | 8/1982 | Madsen et al. | 44/51 |
| 4,355,969 A | 10/1982 | Nelson et al. | 431/4 |
| 4,358,292 A | 11/1982 | Battista | 44/51 |
| 4,358,293 A | 11/1982 | Mark | 44/51 |
| 4,363,637 A | 12/1982 | Knitter et al. | 44/51 |
| 4,364,741 A | 12/1982 | Villa | 44/51 |
| 4,364,742 A | 12/1982 | Knitter et al. | 44/51 |
| 4,374,647 A | 2/1983 | Bezman | 44/56 |
| 4,377,392 A | 3/1983 | Massey et al. | 44/51 |
| 4,378,230 A | 3/1983 | Rhee | 44/51 |
| 4,382,802 A | 5/1983 | Beinke et al. | 44/51 |
| 4,389,219 A | 6/1983 | Naka et al. | 44/51 |
| 4,392,865 A | 7/1983 | Grosse et al. | 44/51 |
| 4,394,131 A | 7/1983 | Marro, Jr. et al. | 44/51 |
| 4,395,266 A | 7/1983 | Han | 44/51 |
| 4,396,397 A | 8/1983 | Kugel et al. | 44/51 |
| 4,396,400 A | 8/1983 | Grangette et al. | 44/75 |
| 4,397,653 A | 8/1983 | Longanbach | 44/51 |
| 4,398,918 A | 8/1983 | Newman | 44/51 |
| 4,400,177 A | 8/1983 | Cottell | 44/51 |
| 4,401,437 A | 8/1983 | Poetschke et al. | 44/2 |
| 4,403,996 A | 9/1983 | Matsuura et al. | 44/1 G |
| 4,406,664 A | 9/1983 | Burgess et al. | 44/51 |
| 4,412,844 A | 11/1983 | Collins et al. | 44/51 |
| 4,422,855 A | 12/1983 | Sawyer, Jr. | 44/51 |
| 4,425,135 A | 1/1984 | Jenkins | 44/51 |
| 4,436,527 A | 3/1984 | Yamamura et al. | 44/51 |
| 4,441,887 A | 4/1984 | Funk | 44/51 |
| 4,441,889 A | 4/1984 | Mark | 44/51 |
| 4,441,890 A | 4/1984 | Feldman | 44/51 |
| 4,446,012 A | 5/1984 | Murthy et al. | 208/130 |
| 4,447,348 A | 5/1984 | Forsberg | 252/75 |
| 4,453,947 A | 6/1984 | Shah et al. | 44/51 |
| 4,465,494 A | 8/1984 | Bourrel et al. | 44/51 |
| 4,469,486 A | 9/1984 | Shah et al. | 44/51 |
| 4,474,578 A | 10/1984 | Cornils et al. | 44/51 |
| 4,475,924 A | 10/1984 | Meyer | 44/51 |
| 4,477,259 A | 10/1984 | Funk | 44/51 |
| 4,477,260 A | 10/1984 | Funk | 44/51 |
| 4,478,602 A | 10/1984 | Kelley et al. | 44/51 |
| 4,478,603 A | 10/1984 | Mark | 44/51 |
| 4,479,806 A | 10/1984 | Funk | 44/51 |
| 4,484,929 A | 11/1984 | Rutter et al. | 44/51 |
| 4,492,590 A | 1/1985 | Schick et al. | 44/51 |
| 4,494,960 A | 1/1985 | Dolkemeyer et al. | 44/51 |
| 4,501,205 A | 2/1985 | Funk | 110/347 |
| 4,511,364 A | 4/1985 | Mitsumori | 44/51 |
| 4,511,365 A | 4/1985 | Mark | 44/51 |
| 4,512,774 A | 4/1985 | Myers et al. | 44/51 |
| 4,526,585 A | 7/1985 | Burgess et al. | 44/51 |
| 4,529,408 A | 7/1985 | Yan | 44/51 |
| 4,530,701 A | 7/1985 | Koskan et al. | 44/51 |
| 4,547,199 A | 10/1985 | Boehmke et al. | 44/51 |
| 4,553,978 A | 11/1985 | Yvan | 44/1 E |
| 4,555,248 A | 11/1985 | Bronfenbrenner et al. | 44/78 |
| 4,595,396 A | 6/1986 | Erdman | 44/63 |
| 4,601,729 A | 7/1986 | Capes et al. | 44/51 |
| 4,604,188 A | 8/1986 | Yan et al. | 208/106 |
| 4,605,420 A | 8/1986 | McGarry et al. | 44/1 R |

| Patent | Date | Inventor | Class |
|---|---|---|---|
| 4,608,057 A | 8/1986 | Davis et al. | 44/51 |
| 4,610,695 A | 9/1986 | Crespin et al. | 44/51 |
| 4,618,348 A | 10/1986 | Hayes et al. | 44/51 |
| 4,622,046 A | 11/1986 | D'Intino et al. | 44/51 |
| 4,623,359 A | 11/1986 | Yaghmaie et al. | 44/51 |
| 4,623,447 A | 11/1986 | Clampitt et al. | 208/187 |
| 4,629,472 A | 12/1986 | Haney, III et al. | 44/51 |
| 4,637,822 A | 1/1987 | Niu et al. | 44/51 |
| 4,650,496 A | 3/1987 | Funk | 44/51 |
| 4,666,457 A | 5/1987 | Hayes et al. | 44/51 |
| 4,670,019 A | 6/1987 | Paspek | 44/51 |
| 4,671,800 A | 6/1987 | Meyer et al. | 44/51 |
| 4,671,801 A | 6/1987 | Burgess et al. | 44/51 |
| 4,684,372 A | 8/1987 | Hayes et al. | 44/51 |
| 4,685,936 A | 8/1987 | Meyer et al. | 44/51 |
| 4,687,491 A | 8/1987 | Latty | 44/51 |
| 4,692,270 A | 9/1987 | Sato et al. | 252/353 |
| 4,696,638 A | 9/1987 | DenHerder | 431/4 |
| 4,696,677 A | 9/1987 | Colegrove et al. | 44/51 |
| 4,704,134 A | 11/1987 | Meyer et al. | 44/51 |
| 4,705,533 A | 11/1987 | Simmons | 44/51 |
| 4,708,720 A | 11/1987 | Grangette et al. | 44/51 |
| 4,711,643 A | 12/1987 | Kemp et al. | 44/51 |
| 4,713,086 A | 12/1987 | Smit et al. | 44/51 |
| 4,725,287 A | 2/1988 | Gregoli et al. | 44/51 |
| 4,732,576 A | 3/1988 | Friedrich et al. | 44/51 |
| 4,737,158 A | 4/1988 | Antonini et al. | 44/51 |
| 4,744,797 A | 5/1988 | Shimada et al. | 44/51 |
| 4,755,325 A | 7/1988 | Osgerby | 252/314 |
| 4,756,721 A | 7/1988 | Correra et al. | 44/7.1 |
| 4,757,833 A | 7/1988 | Danley | 137/13 |
| 4,759,267 A | 7/1988 | Wang et al. | 44/51 |
| 4,770,670 A | 9/1988 | Hazbun et al. | 44/51 |
| 4,780,109 A | 10/1988 | Malone et al. | 44/51 |
| 4,787,915 A | 11/1988 | Meyer et al. | 44/51 |
| 4,793,826 A | 12/1988 | Hayes et al. | 44/51 |
| 4,795,478 A | 1/1989 | Layrisse R. et al. | 44/51 |
| 4,801,304 A | 1/1989 | Polanco et al. | 44/51 |
| 4,804,495 A | 2/1989 | Bouchez et al. | 252/312 |
| 4,821,757 A | 4/1989 | Hayes et al. | 137/13 |
| 4,824,439 A | 4/1989 | Polanco et al. | 44/51 |
| 4,832,701 A | 5/1989 | Polanco et al. | 44/51 |
| 4,832,747 A | 5/1989 | Marchal | 106/277 |
| 4,832,831 A | 5/1989 | Meyer et al. | 208/431 |
| 4,842,616 A | 6/1989 | Verhille | 44/51 |
| 4,877,414 A | 10/1989 | Mekonen | 44/51 |
| 4,886,519 A | 12/1989 | Hayes et al. | 44/51 |
| 4,892,560 A | 1/1990 | Sial | 44/50 |
| 4,907,368 A | 3/1990 | Mullay et al. | 44/51 |
| 4,908,154 A | 3/1990 | Cook et al. | 252/314 |
| 4,911,736 A | 3/1990 | Huang et al. | 44/51 |
| 4,923,483 A | 5/1990 | Layrisse R. et al. | 44/51 |
| 4,933,086 A | 6/1990 | McMahon et al. | 210/603 |
| 4,943,390 A | 7/1990 | Hayes et al. | 252/355 |
| 4,949,743 A | 8/1990 | Broom | 137/13 |
| 4,950,307 A | 8/1990 | Najjar et al. | 44/51 |
| 4,976,745 A | 12/1990 | Rodriguez et al. | 44/301 |
| 4,978,365 A | 12/1990 | Gregoli et al. | 44/301 |
| 4,978,367 A | 12/1990 | Green et al. | 44/281 |
| 4,983,319 A | 1/1991 | Gregoli et al. | 252/314 |
| 4,994,090 A | 2/1991 | Rodriguez et al. | 44/301 |
| 5,000,757 A | 3/1991 | Puttock et al. | 44/301 |
| 5,000,872 A | 3/1991 | Olah | 252/314 |
| 5,008,035 A | 4/1991 | Broom | 252/312 |
| 5,013,462 A | 5/1991 | Danley | 252/8.554 |
| 5,024,676 A | 6/1991 | Moriyama et al. | 44/301 |
| 5,096,461 A | 3/1992 | Frankiewicz et al. | 44/281 |
| 5,097,903 A * | 3/1992 | Wilensky | 166/266 |
| 5,104,418 A | 4/1992 | Genova et al. | 44/302 |
| 5,110,443 A | 5/1992 | Gregoli et al. | 208/46 |
| 5,123,931 A | 6/1992 | Good et al. | 44/281 |
| 5,133,898 A | 7/1992 | Fock et al. | 252/356 |
| 5,196,129 A | 3/1993 | Luisi | 252/49.5 |
| 5,202,056 A | 4/1993 | Sung et al. | 252/351 |
| 5,207,891 A | 5/1993 | Sung et al. | 208/44 |
| 5,217,076 A | 6/1993 | Masek | |
| 5,234,475 A | 8/1993 | Malhotra et al. | 44/282 |
| 5,244,475 A | 9/1993 | Lownds et al. | 44/271 |
| 5,263,848 A | 11/1993 | Gregoli et al. | 431/4 |
| 5,283,001 A | 2/1994 | Gregoli et al. | 252/314 |
| 5,284,492 A | 2/1994 | Dubin | 44/301 |
| 5,288,295 A | 2/1994 | Hypes et al. | 44/301 |
| 5,296,005 A | 3/1994 | Wolfe et al. | 44/551 |
| 5,338,485 A | 8/1994 | Fock et al. | 252/309 |
| 5,344,306 A | 9/1994 | Brown et al. | 431/4 |
| 5,360,458 A | 11/1994 | Forsberg et al. | 44/301 |
| 5,372,613 A | 12/1994 | Mekonen | 44/301 |
| 5,380,343 A | 1/1995 | Hunter | 44/302 |
| 5,401,341 A | 3/1995 | Forsberg et al. | 149/46 |
| 5,411,558 A | 5/1995 | Taniguchi et al. | 44/301 |
| 5,419,852 A | 5/1995 | Rivas et al. | 252/312 |
| 5,439,489 A | 8/1995 | Scalliet et al. | 44/281 |
| 5,445,656 A | 8/1995 | Marelli | 44/310 |
| 5,454,666 A | 10/1995 | Chaback et al. | |
| 5,478,365 A | 12/1995 | Nikanjam et al. | 44/280 |
| 5,478,366 A | 12/1995 | Teo et al. | 44/301 |
| 5,480,583 A | 1/1996 | Rivas et al. | 252/311.5 |
| 5,499,587 A | 3/1996 | Rodriquez et al. | 110/342 |
| 5,503,643 A | 4/1996 | Schriver et al. | 44/282 |
| 5,503,772 A | 4/1996 | Rivas et al. | 252/314 |
| 5,505,876 A | 4/1996 | Rivas et al. | 252/311 |
| 5,505,877 A | 4/1996 | Krivohlavek | 252/314 |
| 5,511,969 A | 4/1996 | Lopes et al. | 431/4 |
| 5,513,584 A | 5/1996 | Rodriguez et al. | 110/342 |
| 5,535,708 A | 7/1996 | Valentine | 123/25 |
| 5,551,956 A | 9/1996 | Moriyama et al. | 44/301 |
| 5,556,574 A | 9/1996 | Rivas et al. | 252/311.5 |
| 5,584,894 A | 12/1996 | Peter-Hoblyn et al. | 44/301 |
| 5,603,864 A | 2/1997 | Silva et al. | 252/311.5 |
| 5,611,824 A | 3/1997 | Stephens | 44/282 |
| 5,622,920 A | 4/1997 | Rivas et al. | 507/232 |
| 5,641,433 A | 6/1997 | Chirinos et al. | 252/312 |
| 5,669,938 A | 9/1997 | Schwab | 44/301 |
| 5,679,236 A | 10/1997 | Poschl | 205/351 |
| 5,685,153 A | 11/1997 | Dickinson et al. | 60/648 |
| 5,693,106 A | 12/1997 | Peter-Hoblyn et al. | 44/301 |
| 5,725,609 A | 3/1998 | Rivas et al. | 44/301 |
| 5,743,922 A | 4/1998 | Peter-Hoblyn et al. | 44/301 |
| 5,746,783 A | 5/1998 | Compere et al. | 44/301 |
| 5,779,990 A | 7/1998 | Iwata | 422/186.04 |
| 5,788,721 A | 8/1998 | Scalliet et al. | 44/281 |
| 5,792,223 A | 8/1998 | Rivas et al. | 44/302 |
| 5,800,576 A | 9/1998 | Johnson et al. | 44/301 |
| 5,807,476 A | 9/1998 | Collins et al. | 208/236 |
| 5,820,640 A | 10/1998 | Ikura et al. | 44/301 |
| 5,834,539 A | 11/1998 | Krivohlavek | 524/60 |
| 5,851,245 A | 12/1998 | Moriyama et al. | 44/301 |
| 5,856,680 A | 1/1999 | Shirodkar | 252/314 |
| 5,873,916 A | 2/1999 | Cemenska et al. | 44/301 |
| 5,879,419 A | 3/1999 | Moriyama et al. | 44/301 |
| 5,885,310 A | 3/1999 | Minamidate | 44/301 |
| 5,900,112 A | 5/1999 | Spontak et al. | 162/30.11 |
| 5,902,227 A | 5/1999 | Rivas | 516/54 |
| 5,902,359 A | 5/1999 | Grosse et al. | 44/281 |
| 5,925,233 A | 7/1999 | Miller et al. | 208/48 AA |
| 5,944,984 A | 8/1999 | Benguigui et al. | 208/309 |
| 5,964,906 A | 10/1999 | Layrisse et al. | 44/302 |
| 5,976,200 A | 11/1999 | Rivas et al. | 44/301 |
| 5,980,733 A | 11/1999 | Collins et al. | 208/236 |
| 5,992,354 A | 11/1999 | Ahern et al. | 123/25 |
| 5,993,495 A | 11/1999 | Sanchez et al. | 44/301 |
| 5,993,496 A | 11/1999 | Sung et al. | 44/301 |
| 5,997,590 A | 12/1999 | Johnson et al. | 44/301 |
| 5,997,591 A | 12/1999 | Matsuda et al. | 44/301 |
| 6,001,886 A | 12/1999 | Shirodkar | 516/51 |
| 6,010,544 A | 1/2000 | Haldeman et al. | 44/301 |

| | | | | | | |
|---|---|---|---|---|---|---|
| 6,016,868 A * | 1/2000 | Gregoli et al. ............... 166/261 | | 6,503,286 B1 | 1/2003 | Lacaze et al. ................ 44/301 |
| 6,017,368 A | 1/2000 | Steinmann ................... 44/302 | | 6,511,937 B1 | 1/2003 | Bearden, Jr. et al. ....... 502/180 |
| 6,030,424 A | 2/2000 | Matsumoto ................... 44/301 | | 6,530,964 B2 | 3/2003 | Langer et al. ................ 44/301 |
| 6,036,473 A | 3/2000 | Ichinose et al. ................. 431/4 | | 6,530,965 B2 | 3/2003 | Warchol ....................... 44/301 |
| 6,066,186 A | 5/2000 | Matsumoto ................... 44/301 | | 6,530,966 B1 | 3/2003 | Kriech et al. ................. 44/542 |
| 6,066,679 A | 5/2000 | Leviness et al. ............ 518/709 | | 6,569,909 B1 | 5/2003 | O'Reilly et al. ............ 518/700 |
| 6,068,670 A | 5/2000 | Haupais et al. ............... 44/301 | | 6,589,301 B1 | 7/2003 | Magnin et al. ............... 44/301 |
| 6,069,178 A | 5/2000 | Layrisse et al. ............... 516/50 | | 6,595,291 B1 * | 7/2003 | Lia et al. .................. 166/305.1 |
| 6,077,322 A | 6/2000 | Shiao .......................... 44/301 | | 6,606,856 B1 | 8/2003 | Brown et al. ................. 60/299 |
| 6,080,211 A | 6/2000 | Mathur ....................... 44/301 | | 6,607,566 B1 | 8/2003 | Coleman et al. ............. 44/301 |
| 6,113,659 A | 9/2000 | Logaraj et al. ............... 44/280 | | 6,623,535 B1 | 9/2003 | Kief ............................ 44/301 |
| RE36,983 E | 12/2000 | Hayes et al. .................. 44/301 | | 6,638,323 B2 | 10/2003 | Tsai et al. ..................... 44/301 |
| 6,183,629 B1 | 2/2001 | Bando et al. ............... 208/426 | | 6,648,929 B1 | 11/2003 | Daly et al. .................... 44/301 |
| 6,187,063 B1 | 2/2001 | Gunnerman ................. 44/301 | | 6,652,607 B2 | 11/2003 | Langer et al. ................ 44/301 |
| 6,190,427 B1 | 2/2001 | Ahmed ........................ 44/302 | | 6,656,236 B1 | 12/2003 | Coleman et al. ............. 44/301 |
| 6,194,472 B1 | 2/2001 | Logaraj et al. ............... 516/43 | | 6,663,680 B1 | 12/2003 | Dodd et al. ................... 44/301 |
| 6,211,251 B1 | 4/2001 | Satterfield .................... 516/10 | | 6,677,387 B2 | 1/2004 | Gurfinkel Castillo et al. 516/53 |
| 6,235,067 B1 | 5/2001 | Ahern et al. .................. 44/301 | | 6,736,215 B2 | 5/2004 | Maher et al. |
| 6,248,140 B1 | 6/2001 | Genssler et al. .............. 44/281 | | 6,740,133 B2 | 5/2004 | Hundley, Jr. ................. 44/301 |
| 6,280,485 B1 | 8/2001 | Daly et al. .................... 44/301 | | 6,745,831 B2 | 6/2004 | de Rouffignac et al. |
| 6,280,486 B1 | 8/2001 | Dessauer et al. ............. 44/302 | | 6,805,195 B2 | 10/2004 | Vinegar et al. |
| 6,281,253 B1 | 8/2001 | Satterfield .................... 516/10 | | 6,808,693 B2 | 10/2004 | Arnaud et al. |
| 6,293,975 B1 | 9/2001 | Scalliet et al. ................ 44/281 | | 6,860,911 B2 | 3/2005 | Hundley ....................... 44/620 |
| 6,294,587 B1 | 9/2001 | Wittenbrink et al. ......... 516/76 | | 6,883,607 B2 | 4/2005 | Nenniger et al. |
| 6,296,676 B1 | 10/2001 | Nohara ........................ 44/301 | | 2002/0005374 A1 | 1/2002 | Roby, Jr. et al. ............. 208/86 |
| 6,306,184 B2 | 10/2001 | Ahmed ........................ 44/302 | | 2002/0157304 A1 | 10/2002 | Warchol ....................... 44/301 |
| 6,325,833 B1 | 12/2001 | Berlowitz .................... 44/301 | | 2004/0205995 A1 | 10/2004 | Zucchelli et al. ............. 44/500 |
| 6,331,575 B1 | 12/2001 | Mauldin ..................... 518/715 | | | | |
| 6,364,917 B1 | 4/2002 | Matsumura et al. .......... 44/301 | | FOREIGN PATENT DOCUMENTS | | |
| 6,368,366 B1 | 4/2002 | Langer et al. ................ 44/301 | | | | |
| 6,368,367 B1 | 4/2002 | Langer et al. ................ 44/301 | | WO WO 01/60952 A1 8/2001 | | |
| 6,368,368 B1 | 4/2002 | Reeves ........................ 44/301 | | | | |
| 6,371,998 B1 | 4/2002 | Mathur ........................ 44/301 | | OTHER PUBLICATIONS | | |

6,375,689 B2  4/2002  Marelli ....................... 44/301
6,379,404 B1  4/2002  Ru ............................. 44/301
6,383,237 B1  5/2002  Langer et al. ................ 44/301
6,384,091 B2  5/2002  Layrisse et al. ............. 516/50
6,386,750 B2  5/2002  Marelli ..................... 366/152.1
6,413,361 B1  7/2002  Hino et al. ................... 159/44
6,419,714 B2  7/2002  Thompson et al. ............ 44/31
6,440,000 B1  9/2002  Firey .............................. 44/639
6,447,556 B1  9/2002  Cemenska et al. ............. 44/301
6,458,855 B1  10/2002  Wittenbrink et al. ......... 516/76
6,471,732 B1  10/2002  Shimada ....................... 44/281

Alstom; "Oxygen-fired Circulating Fluidized Bed (CFB) Technology Development"; Aug. 9-11, 2004; Calgary, Alberta, Canada.
SPE (Society of Petroleum Engineers); S. Doieschall, A. Szittar and G. Udvardi; "Review of the 30 Years' Experience of the CO2 Imported Oil Recovery Projects in Hungary"; SPE22362; pp. 305-317; Mar. 24-27, 1992; Beijing, China.
Emulsification A solution to Asphaltene Handling Problems, Dr. Sundaram Logaraj et al.; Presented at the ISSA/AEMA 2nd Joint Conference, Mar. 12-13, 2000, Amelia Island, Florida, USA.

* cited by examiner

FLUE GAS INJECTION FOR HEAVY OIL RECOVERY

CROSS-REFERENCE TO RELATED APPLICATIONS

This is the first application filed for the present invention.

TECHNICAL FIELD

The present invention relates to the thermal recovery of values from a subterranean formation by making use of a flue gas injection into the formation.

BACKGROUND OF THE INVENTION

In the heavy oil industry, there are a broad range of classifications attributable to the oil. The classes are essentially based on viscosity and density of the material and are generally broken down as follows:
 i) Medium Heavy Oil
  $25°>°$ API$>18°$
  100 cPs$>\mu>10$ cPs, mobile at reservoir conditions
 ii) Extra Heavy Oil
  $20°>°$ API$>12°$
  10,000 cPs$>\mu>100$ cPs, production enhancement techniques required including reservoir stimulation such as thermal or water/solvent flooding
 iii) Oil Sands and Bitumen
  $12°>°$ API$>6°$, mined or thermal stimulation required
  $\mu>10,000$ cPs, production enhancement techniques required including reservoir stimulation such as thermal or thermal/solvent injection.

In view of the recognized value of vast reserves of heavy oil and bitumen potentially available in Canada, Central America, Russia, China and other locations of the world, a varied panoply of extraction and handling techniques have come to light.

Currently, existing bitumen and extra heavy oil reservoirs are exploited using enhanced thermal recovery techniques resulting in efficiency of recovery in the range of between 20 and 25%. The most common thermal technique is steam injection where heat enthalpy from the steam is transferred to the oil by condensation. This, of course, reduces the viscosity of the oil allowing gravity drainage and collection. Injection may be achieved by the well known cyclic steam simulation (CSS), Huff and Puff and Steam Assisted Gravity Drainage (SAGD).

Although SAGD is becoming widely employed, it is not without several detriments regarding efficiency. An area which presents significant costs is the fuel to drive the steam generators to produce steam for injection. The most desirable fuel is natural gas, but the expense greatly reduces the overall efficiency and this problem is compounded with the fact that green house gases (GHG) are liberated in varied amounts during operation of the steam generators using all types of hydrocarbon fuels. As an example, approximately 8,000 to 15,000 Tonnes daily of carbon dioxide is generated to produce injection steam and produce 100,000 BOPD of bitumen.

A further problem in the SAGD process is the upgrading required in the produced product to increase its value.

As noted briefly above, another factor affecting SAGD is the limitation in recovery efficiency.

In an attempt to ameliorate some of the limitations noted, the use of alternate fuels other than natural gas has been proposed to at least reduce the ever increasingly impact of natural gas. An example of a suitable fuel for use in a SAGD operation is discussed in U.S. Pat. No. 6,530,965, issued to Warchol, Mar. 11, 2003. The document teaches the formation of predispersed residuum in an aqueous matrix which is burnable as a alternate fuel.

Considering the problems with existing technologies, it remains desirable to have a method of enhancing efficiency in a SAGD operation, reducing the formation of excessive amounts of GHG and lowering costs by providing an alternate fuel with the thermal performance of natural gas.

The present invention collates all of the most desirable features and advantages noted with an energy efficient, high yield green environmentally friendly process.

SUMMARY OF THE INVENTION

One object of the present invention is to provide an improved thermal recovery process with enhanced efficiency.

A further object of one embodiment is to provide a method for recovering heavy oil and bitumen from a subterranean formation containing heavy oil and bitumen, comprising: providing a fuel; burning the fuel in a flue gas recirculation circuit to produce an injection flue gas for injection into the formation; and injecting the injection flue gas into the formation to displace the heavy oil and bitumen.

A still further object of one embodiment of the present invention is to provide a method for recovering heavy oil and bitumen from a subterranean formation containing heavy oil and bitumen, comprising: providing a fuel; burning the fuel in a flue gas recirculation circuit to produce a flue gas for injection into the formation; and injecting the flue gas into the formation to displace the heavy oil and bitumen and natural gas.

Still another object of one embodiment of the present invention is to provide a method for recovering gas and bitumen from at least one of a steam assisted gravity drainage formation containing gas over bitumen within the volume of the formation and/or from a geographically proximate formation, comprising; providing a flue gas recirculation circuit to produce modified flue gas; injecting the modified flue gas within the volume at a pressure sufficient to displace the gas over the bitumen and to displace the bitumen from within the formation; recovering displaced gas and bitumen; and maintaining the pressure or repressurizing the volume with the modified flue gas to a pressure substantially similar to a pressure prior to injection of the modified flue gas.

Yet another object of one embodiment of the present invention is to provide a method for recovering gas and bitumen from at least one of a steam assisted gravity drainage formation containing gas over bitumen within the volume of the formation and from a geographically proximate formation, comprising; a steam generation phase for generating steam for injection into the formation; a flue gas recirculation phase for modifying flue gas for injection into the formation; an injection phase for injecting modified flue gas into the formation for displacing gas over the bitumen and maintaining the pressure or repressurizing the formation; and a processing phase for processing produced displaced gas and liquid liberated from the injection phase.

Having thus generally described the invention, reference will now be made to the accompanying drawings illustrating preferred embodiments.

BRIEF DESCRIPTION OF THE DRAWINGS

Further features and advantages of the present invention will become apparent from the following detailed description, taken in combination with the appended drawings.

Similar numerals employed in the description denote similar elements

It will be noted that throughout the appended drawings, like features are identified by like reference numerals.

DETAILED DESCRIPTION OF THE PREFERRED EMBODIMENTS

Preface

Unless otherwise indicated, SAGD refers to steam assisted gravity drainage, SYNGAS, refers to synthetic gas, OTSG refers to once through steam generation, GHG refers to green house gas, BOPD refers to barrels of oil per day, COGEN refers to combined production of electric generation or compression service with heat recovery and steam generation, HRSG refers to heat recovery steam generator, and "heavy oil" embraces heavy oil, extra heavy oil and bitumen as understood in the art.

Figure 1:
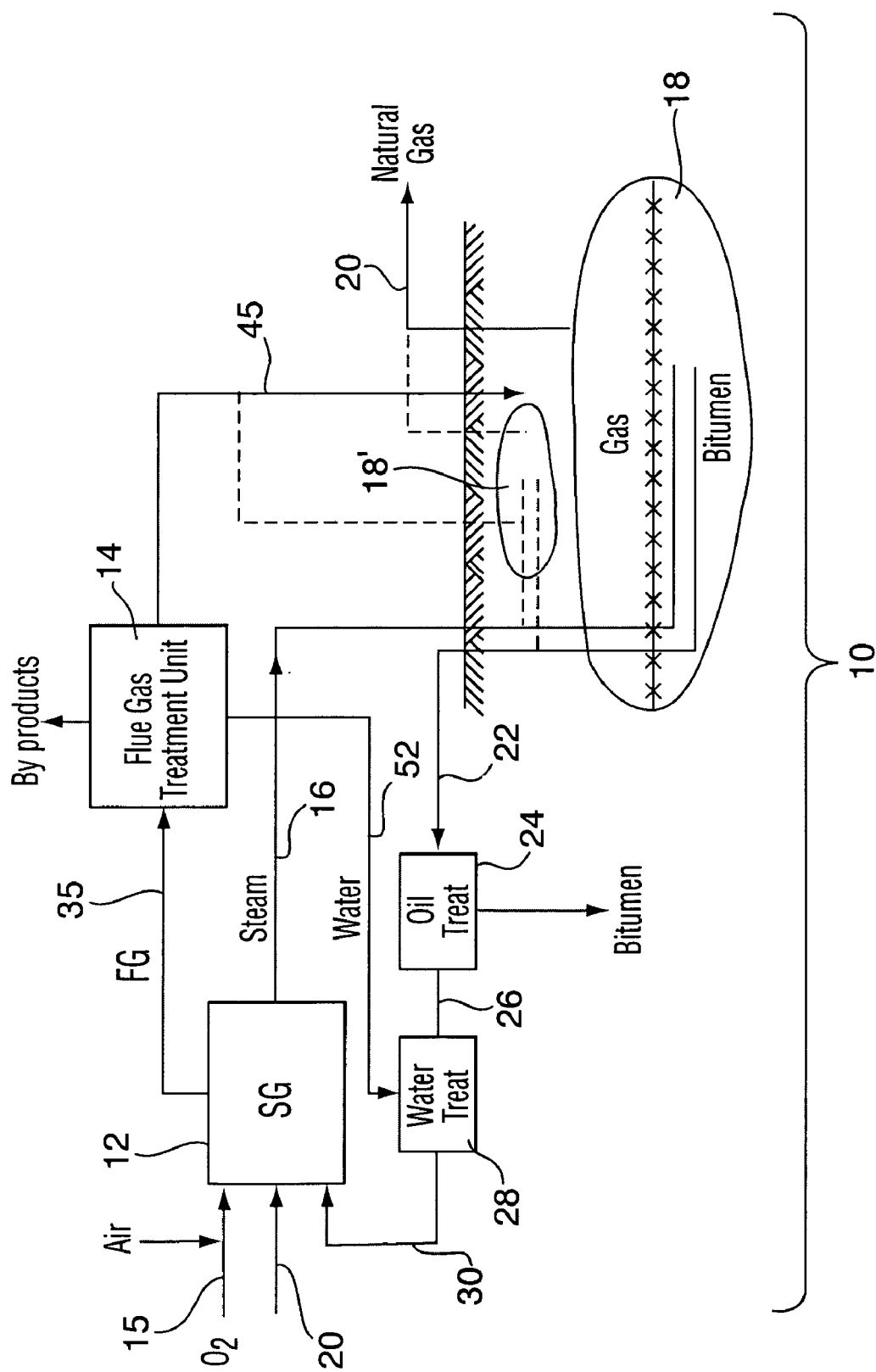
FIG. 1 is a schematic illustration of the generic methodology according to one embodiment.

Referring now to FIG. 1, shown is a schematic illustration of one embodiment of the present invention. Numeral 10 broadly denotes the overall process. An air, fuel and oxygen mixture combined with a Flue Gas Recirculation (FGR) stream is fed to a steam generation system 12 to generate steam 16 and flue gas 35. The air, fuel, oxygen and FGR mixture is selected to create an enriched flue gas 35 to optimize recovery of gas and heavy oil from within a formation containing these. This will be discussed in greater detail herein after.

The fuel, contained in any of air or oxygen mixture, may be selected from any suitable hydrocarbon fuel, non limiting examples of which include natural gas, bitumen, fuel oil, heavy oil, residuum, emulsified fuel, multiphase superfine atomized residue (MSAR, a trademark of Quadrise Canada Fuel Systems), asphaltenes, petcoke, coal, and combinations thereof.

Flue gas 35 from the system 12 is treated or modified in a treatment operation 14 prior to injection within a formation. This flue gas may contain numerous gaseous compounds including carbon dioxide, carbon monoxide, nitrogen, nitrogen oxides, hydrogen, sulfur dioxide, syngas inter alia. At excess oxygen burning conditions, where oxygen levels are present in the flue gas 35, then the flue gas 35 will primarily contain carbon dioxide, nitrogen and water vapour. The treated injection gas 45 is injected into gas and heavy oil formation(s) generically denoted by numeral 18, shown in the example as a SAGD (steam assisted gravity drainage) formation. As is well known, this technique involves the use of steam to assist in reducing the viscosity of viscous hydrocarbons to facilitate mobility. These formations also contain natural gas, bitumen and a variety of other hydrocarbons which have value, but which were previously marginally economic or fiscally unfeasible to recover. Steam 16 from system 12 is introduced into the formation 18 as illustrated.

The gas in the formation 18 is now made recoverable in an efficient manner in view of the flue gas circuit in combination with injection of the modified flue gas 45. The union of these operations has resulted in the success of the methodology of the present invention. Advantageously, the techniques set forth herein can be applied not only to gas over bitumen formations, but also geographically proximate formations. As a non limiting example, laterally or vertically displaced formations can be exploited as well. This is generally shown in FIG. 1 and denoted by numeral 18'. The benefits of the instant technology also accrue for abandoned SAGD chambers or for blowdown where flue gas can be injected to not only maintain heavy oil recovery but also to displace the heavy oil.

Natural gas 20 displaced from formation 18 is collected and may be subjected to additional unit operations or a portion may be recirculated into the system as fuel for steam generation. This latter step is not shown in FIG. 1, but is well within the purview of one skilled.

Mobilized production fluids, containing bitumen denoted by numeral 22 are then subjected to an oil treatment operation 24 where the bitumen 26 is processed for the removal of entrained water to produce a saleable product. Produced water 26 is further treated in a suitable water treatment unit 28 to remove bitumen, hardness compounds, silica and any other undesirable compounds making the water suitable of boiler feed water 30. Any suitable water treatment operations may be employed to achieve the desired result. Boiler feed water 30 may then be recirculated into system 12 for steam 16 production, thus reducing water demands in the process to augment efficiency. Further to this, water evolved from the flue gas treatment operation, the water being represented by numeral 52 may be recirculated at 28, also to augment efficiency.

Having broadly discussed the overall process, numerous advantages attributable to the process are evinced. These include:

i) an efficient and environmentally safe disposal of harmful flue gas;
ii) improved gas recovery from the formation;
iii) enhanced thermal recovery operation to produce more bitumen per unit steam;
iv) carbon dioxide sequestering to reduce GHG emissions;
v) volumetric replacement within the formation; and
vi) any combination of these features.

Figure 2:
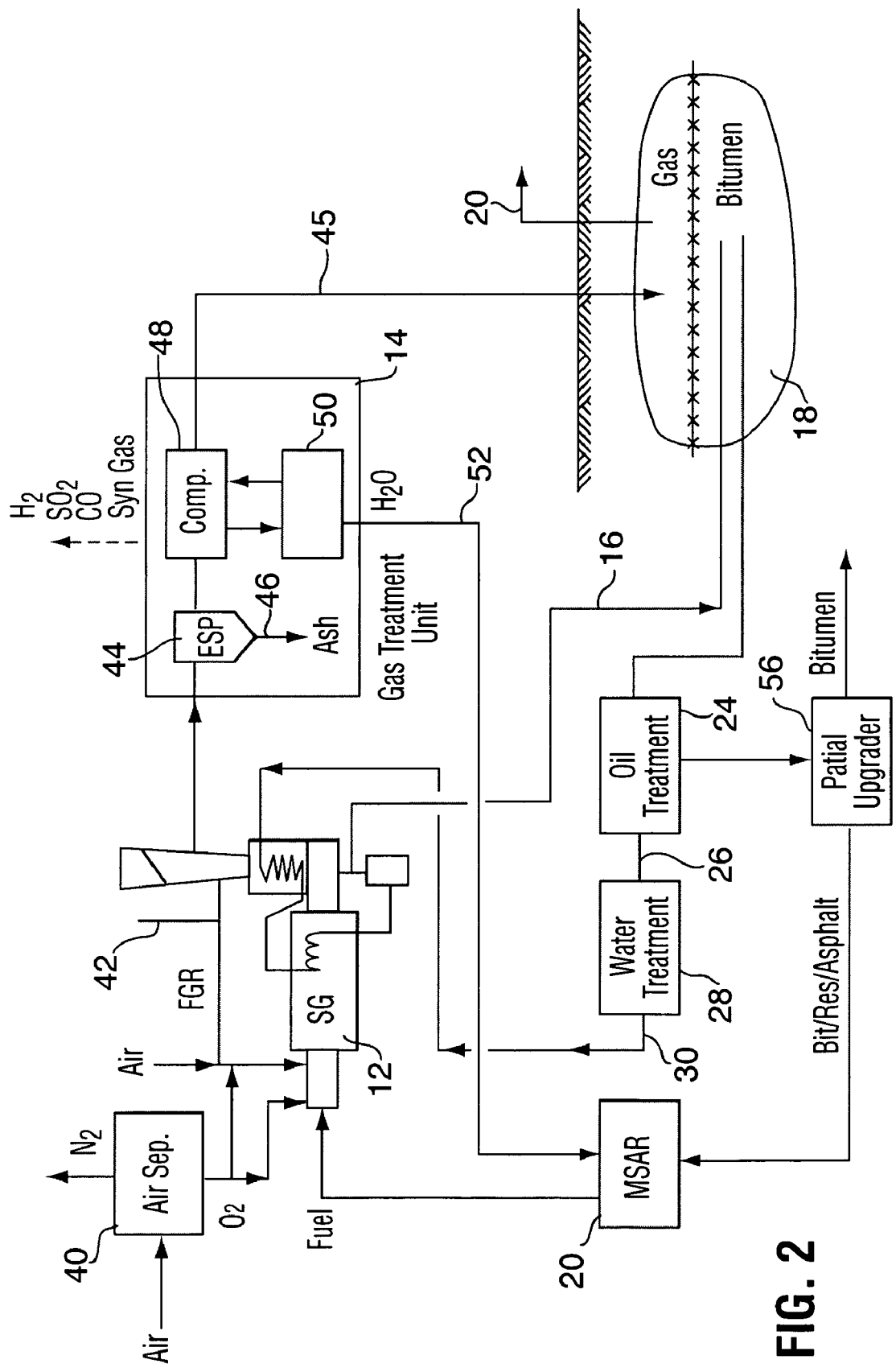
FIG. 2 is a more detailed schematic illustration of FIG. 1.

Referring now to FIG. 2, shown is a more detailed schematic of the process according to one embodiment. In the embodiment shown, an air separator unit 40 is provided for gaseous separation prior to injection of fuel and oxygen into the steam generation system 12. A flue gas recirculation (FGR) circuit is provided for the system 12. The flue gas recirculation is useful to reduce the temperature of the combustion zone in the system 12 in order to maintain compatible steam generator performance for the full range of oxygen input versus combustion air used in steam generation process. Without the flue gas recirculation (FGR) for higher levels of oxygen, the heat generator temperature would exceed the design limitations of the steam generators. The flue gas exiting the circuit is then processed in treatment unit 14, where it is subjected to particulate removal, such as electrostatic precipitation or baghouse 44, with the ash discharged at 46. The so treated gas is further quenched prior to being compressed at 48 and further dehydrated at 50. Water 52 from the operation can be circulated to the water treatment unit 28 or a MSAR formulation phase 70 discussed herein after. By product gas from 14 if produced, can be separated and recovered from the flue gas and used for further operations such as CO fuel for process furnaces or boilers, SO2 for commercial sales or H2 hydrogen supply for bitumen upgrading.

In this example, bitumen leaving oil treatment 24 may be processed in a partial or full upgrader 56 with partially upgraded bitumen or synthetic crude being discharged at 58 and a hydrocarbon mixture consisting of bitumen, residuum, asphaltenes, or coke etc. may be further processed into MSAR, an efficient fuel discussed in detail in U.S. Pat. No. 6,530,965 comprising essentially a predispersed residuum in an aqueous matrix which greatly reduces the fuel cost to operate the steam generation system. Traditionally, the latter was done with natural gas, the cost for which greatly exceeded the cost involved with the use of MSAR. As an option, the fuel may be supplanted or augmented by those fuels previously taught.

Figure 3:
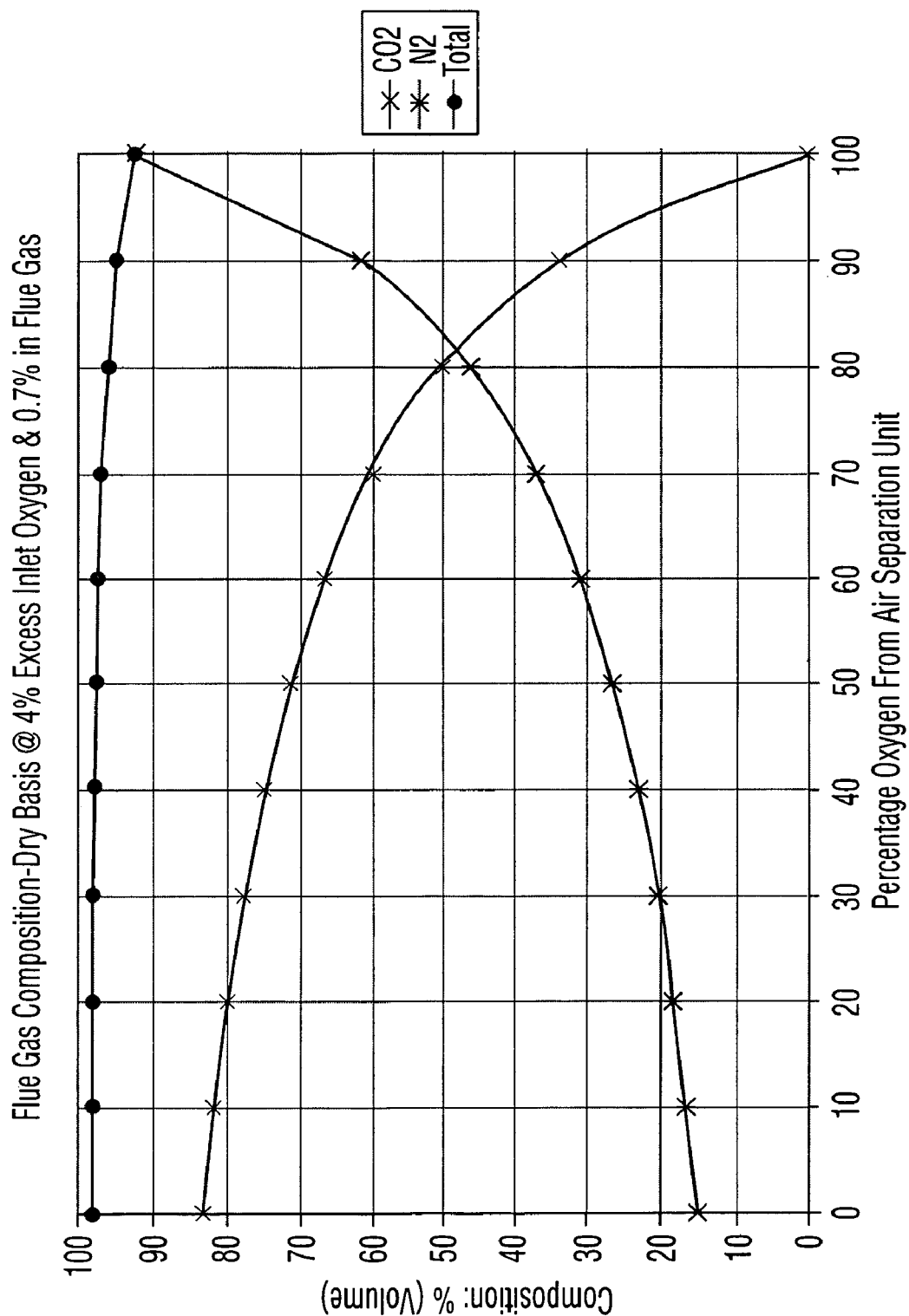
FIG. 3 is a graphical illustration of the oxygen requirement for flue gas carbon dioxide enrichment on a dry basis.
Figure 4:
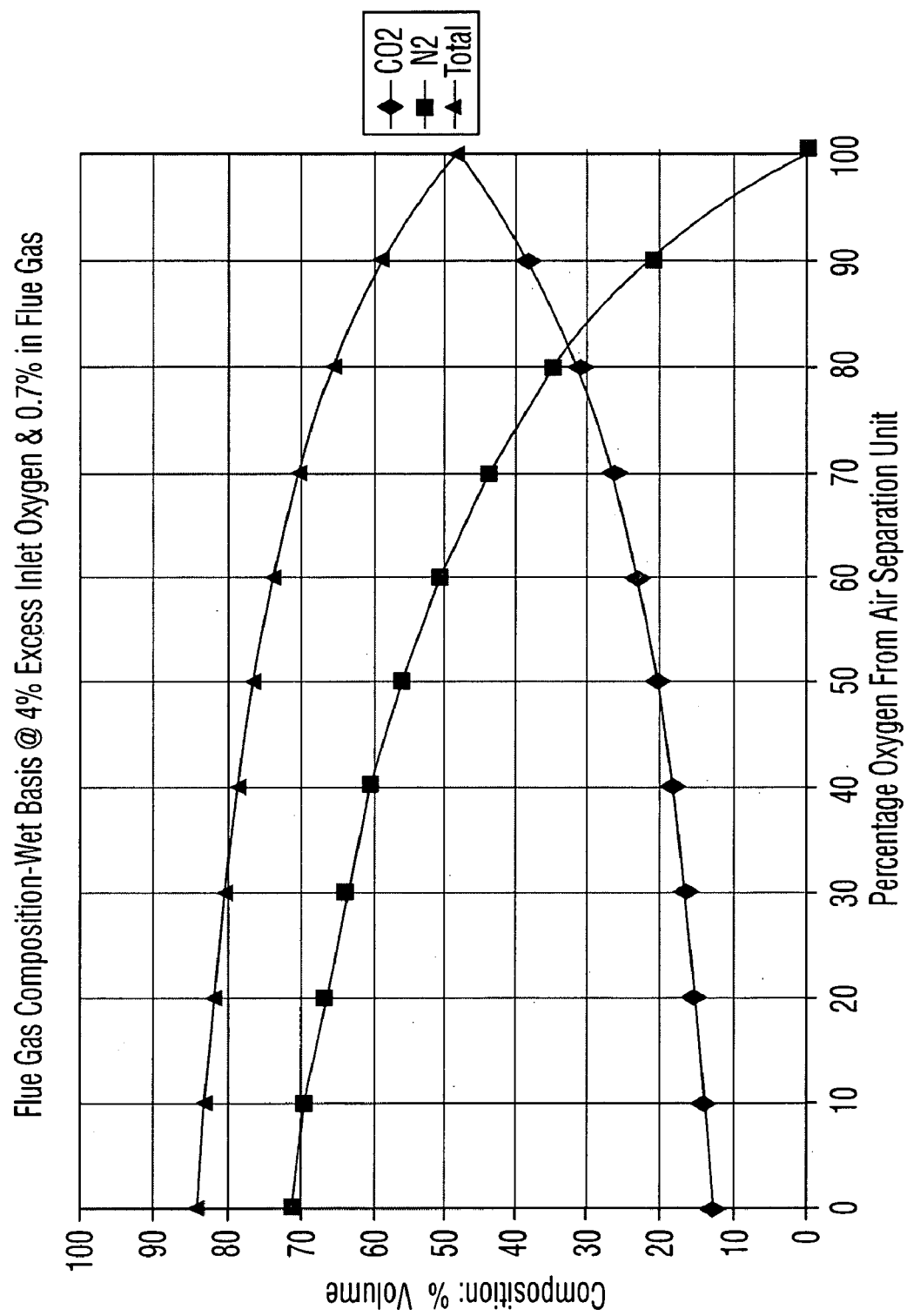
FIG. 4 is a graphical illustration of the oxygen requirement for flue gas carbon dioxide enrichment on a wet basis.

FIGS. 3 and 4 graphically depict the oxygen requirement for flue gas carbon dioxide enrichment on a dry and wet basis, respectively. As pure oxygen is introduced to the steam generator operation, the flue gas 35 will contain less nitrogen for a fixed quantity of carbon dioxide. Therefore both the volume of flue gas is reduced and the concentration of carbon dioxide in the injection treated gas 45 is increasing. For example, on a dry basis with reference to FIG. 3, as the oxygen level used approaches 100% (0% combustion air), then the composition of the treated flue gas approaches near 100% $CO_2$, including minor compounds of carbon monoxide, sulfur dioxide, nitrogen dioxide, etc. FIG. 3 represents the primary composition of the treated injection gas 45. Referring to FIG. 4, graphically illustrated is the primary composition of the flue gas stream 35 prior to flue gas treatment in 14.

Figure 5:
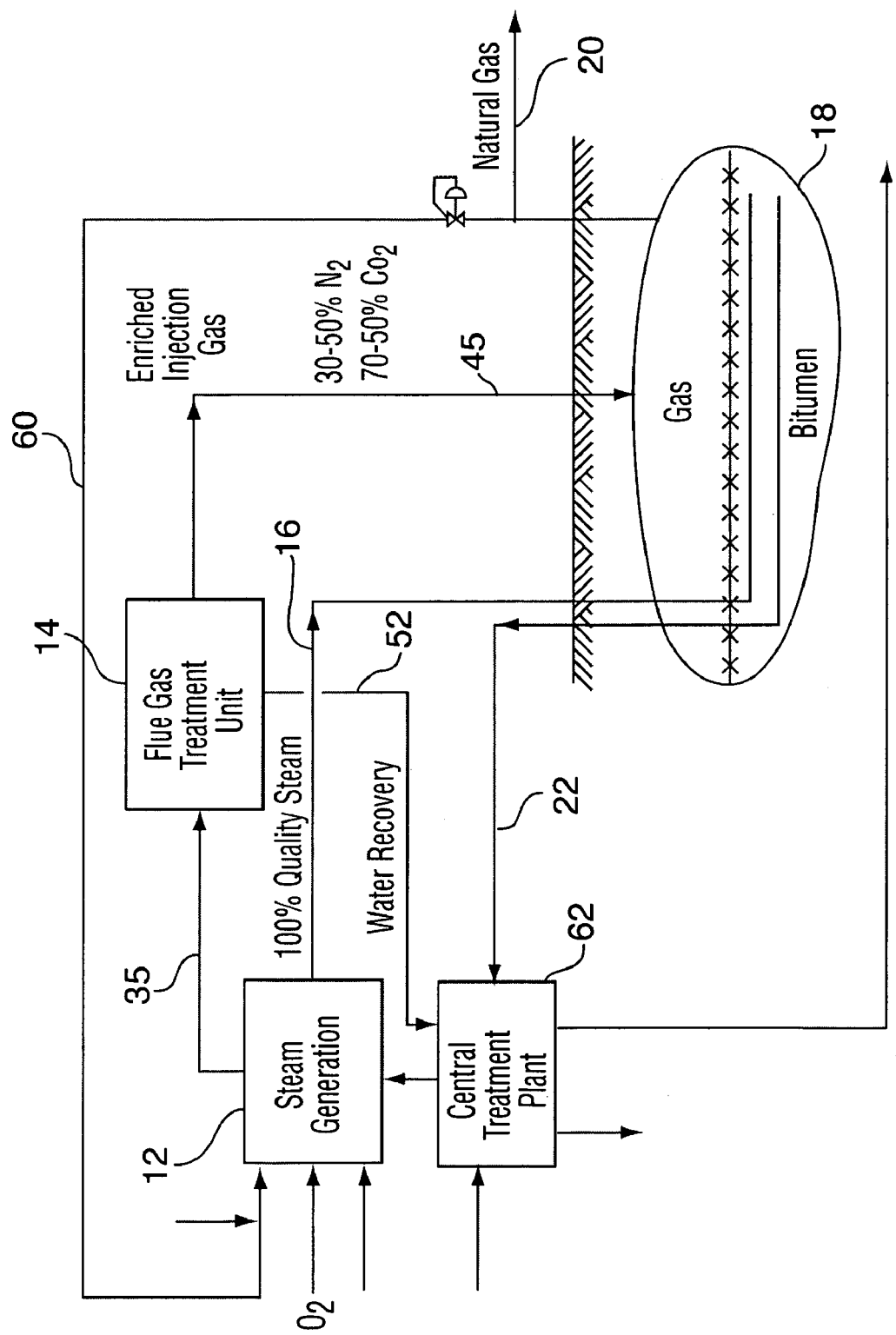
FIG. 5 is a schematic illustration of natural gas steam production in a SAGD environment.

FIG. 5 is a schematic illustration of a natural gas steam production circuit. In the example, at least a portion of the displaced natural gas 20 may be recirculated as a fuel to drive the steam generation system 12. This is denoted by numeral 60. The enriched injection flue gas, which may be customized to contain between 30% and 50% nitrogen and between 70% and 50% carbon dioxide, is injected to displace the produced fluids, bitumen, natural gas, water etc processed for upgrading at 62. The choice of operations conducted at 62 will depend upon the desired products.

Recovered water 52 from the flue gas treatment unit 14 may be recirculated to 62.

Figure 6:
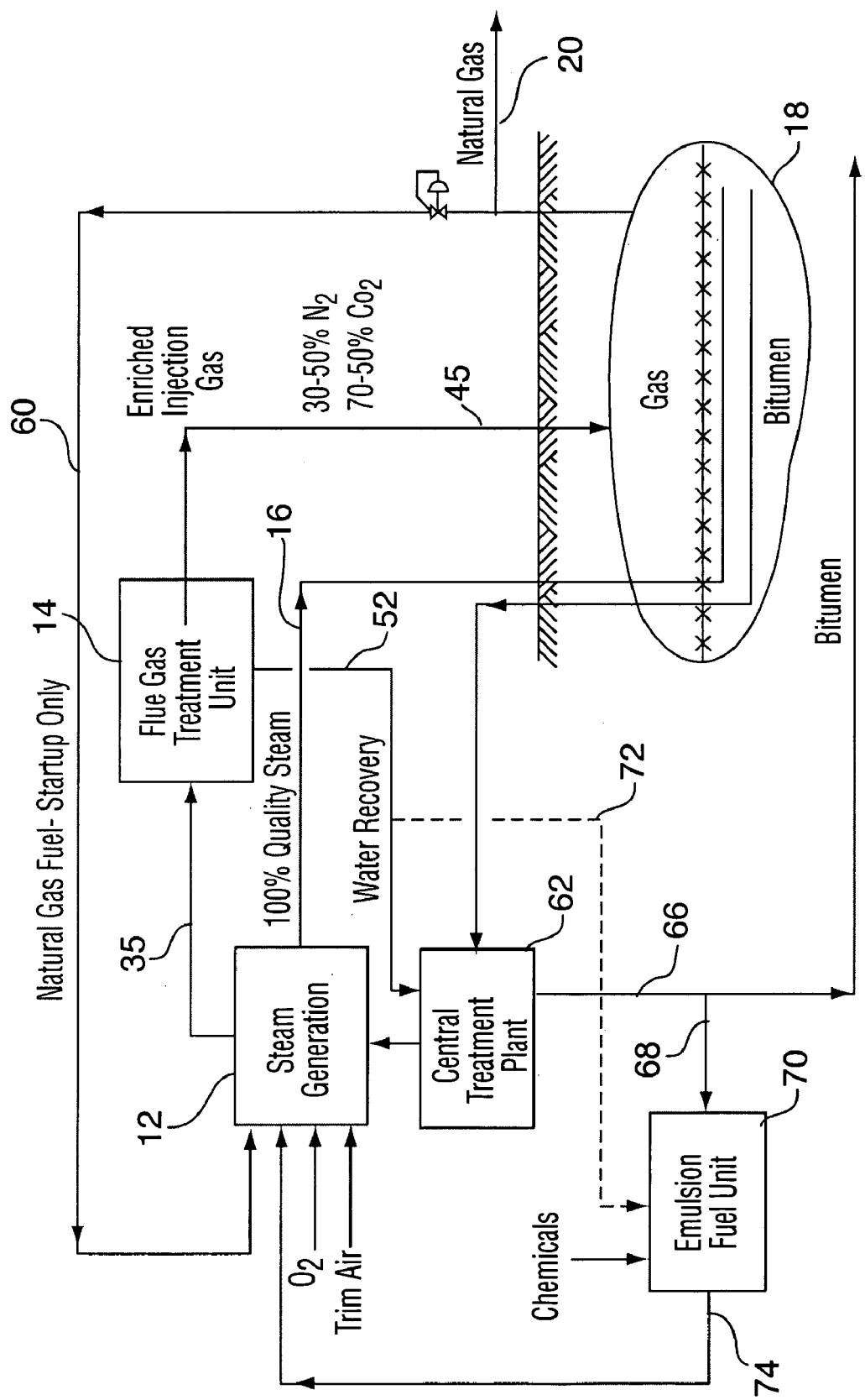
FIG. 6 is a schematic illustration of bitumen or emulsion fuel steam production in a SAGD environment.

Referring to FIG. 6, shown is a further variation on the process where the steam generation is achieved by making use of a liquid alternate fuel, shown in the example is a bitumen or heavy oil fuel, or alternatively, the bitumen or heavy oil is transformed into an emulsion fuel. In this arrangement, processed bitumen exiting central treatment plant 62 at line 66 may be diverted in terms of a portion of the material only at line 68 directly as heavy fuel oil or alternatively, directed into an emulsion unit for generating an alternate fuel. The emulsion unit stage being indicated by numeral 70. An additional amount of water recovered and circulated at 52 may be diverted and introduced into the unit 70 via line 72. In the emulsion fuel unit, the suitable chemicals are added to the bitumen material (surfactants, etc.) in order to generate the alternate fuel. At this point, once formulated, the alternate fuel exiting the unit at 74 may be introduced as a fuel to drive the steam generation system 12. The natural gas feed from the displaced gas in the formulation 18 used as fuel ceases and the process does not deplete any further volume of the natural gas. In this manner, once the emulsion unit is operational and stabilized, the process simply relies on alternate fuel that it generates on its own.

Figure 7:
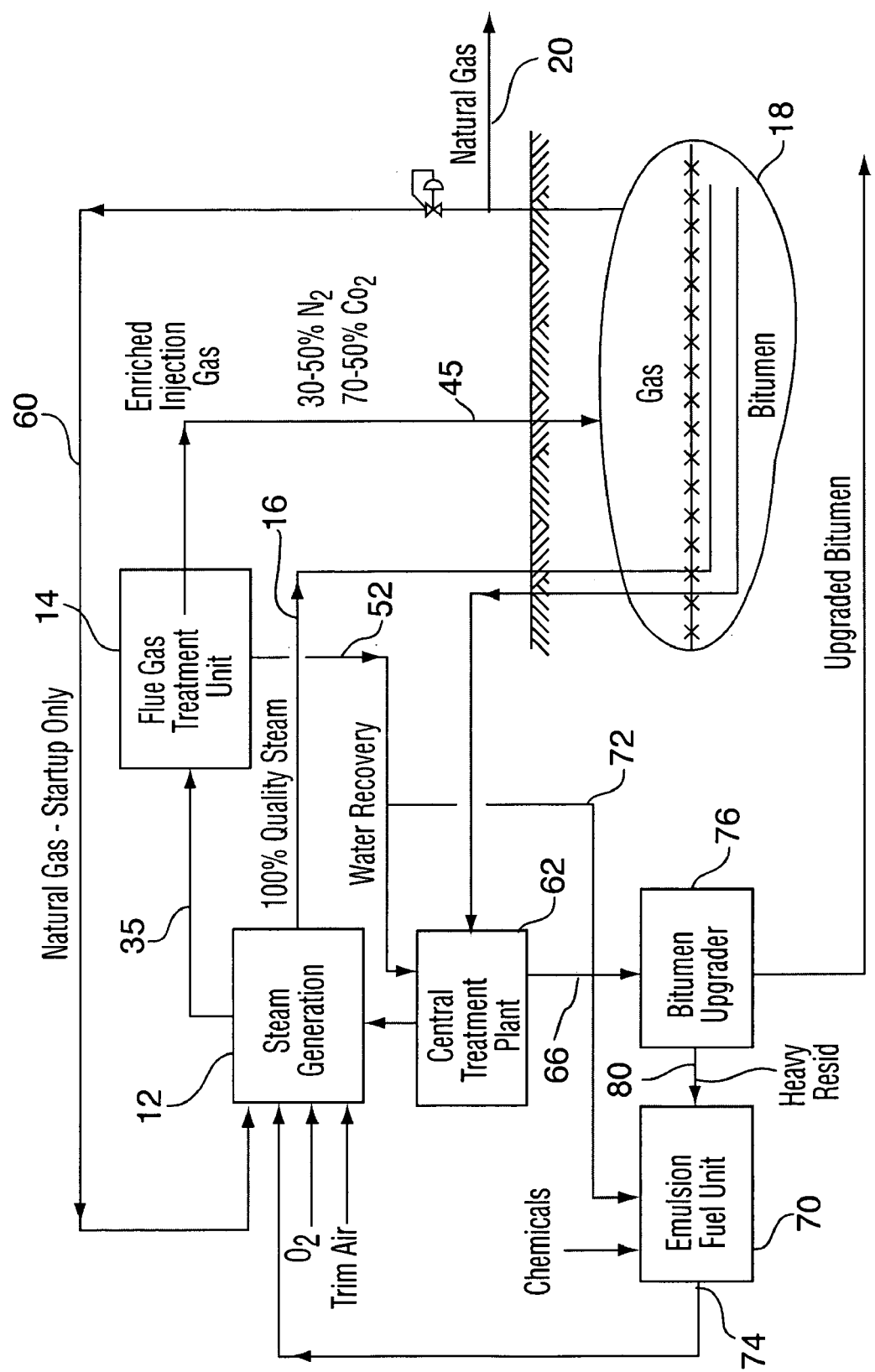
FIG. 7 is a schematic illustration of residuum emulsion fuel steam production in a SAGD environment.

Referring to FIG. 7, shown is a further variation in the arrangement shown in FIG. 6 where a bitumen upgrader 76 is shown added to the unit operation of the central treatment plant. In this manner, materials leaving central treatment plant 66 are upgraded in the upgrader 76 to formulate heavy residuum exiting at 80 which then can be formulated into an emulsified alternate fuel and introduced into steam system 12 as noted with respect to FIG. 6. Subsequent benefit can be realized in the upgrading of the bitumen quality to deasphalted oil or synthetic crude oil.

Figure 8:
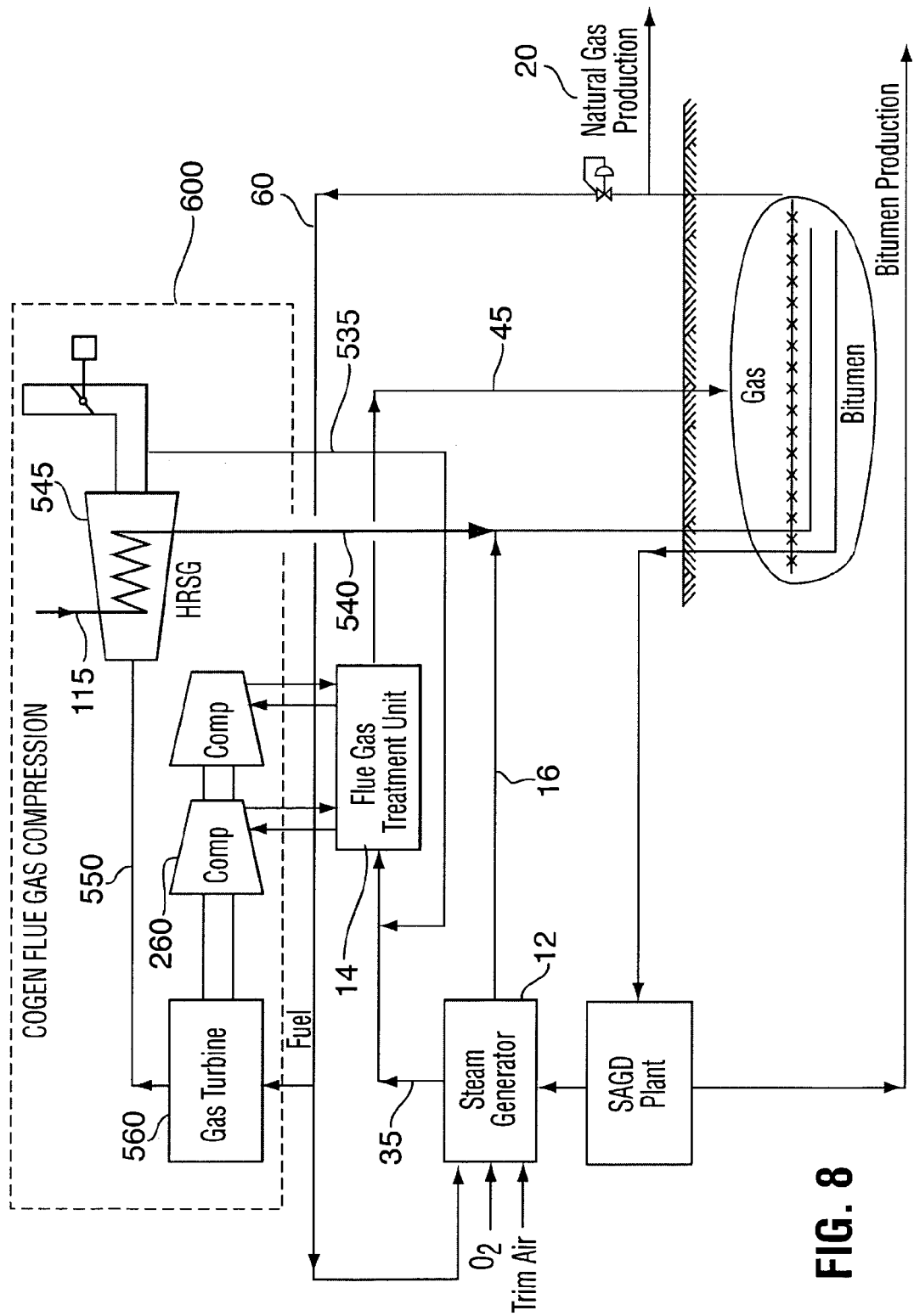
FIG. 8 is a schematic illustration of a cogeneration flue gas compression operation.

Referring to FIG. 8, whereby one embodiment of the current invention is employed in combination with a conventional gas cogeneration (COGEN) plant 600 to enhance the overall thermal heavy oil recovery operation. Uniquely, when the current embodiment is combined, the steam generators 12 as described previously can be suitably fitted with COGEN heat recovery steam generator (HRSG) to produce the required total injection steam and provide the required power to drive the treated injection flue gas compressors.

Figure 9:
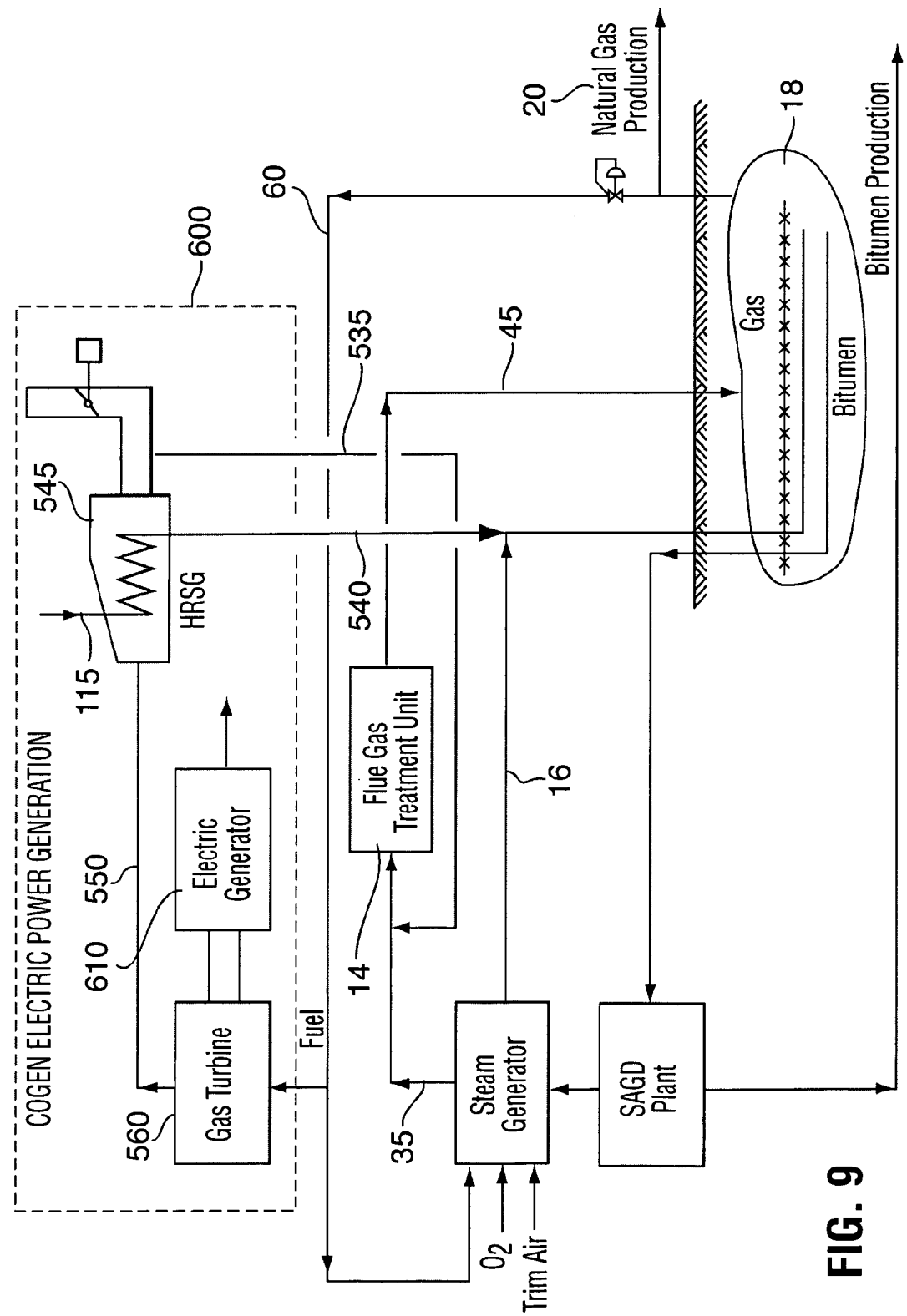
FIG. 9 is a schematic illustration of a cogeneration electric power generation operation.

FIG. 9 further illustrates a further embodiment whereby the steam generators 12 are combined with a COGEN plant 600 to generate electric power. The electric power generated could be used to drive the treated flue gas compressors and power the full facility 10 to make it self sufficient in energy.

Although embodiments of the invention have been described above, it is limited thereto and it will be apparent to those skilled in the art that numerous modifications form part of the present invention insofar as they do not depart from the spirit, nature and scope of the claimed and described invention.

We claim:

1. A method for recovering heavy oil and bitumen from a subterranean formation containing heavy oil and bitumen, comprising:
   providing a fuel;
   providing steam generation means for generating steam and injecting said steam into said subterranean formation;
   providing a flue gas recirculation circuit;
   burning said fuel in a flue gas recirculation circuit to produce a modified flue gas for injection into said formation; and
   injecting said flue gas and said steam into said formation to displace said heavy oil and bitumen.

2. The method as set forth in claim 1, wherein said fuel is a fossil fuel.

3. The method as set forth in claim 2, wherein said fuel is selected from the group consisting of natural gas, fuel oil, heavy oil, bitumen, residuum, emulsified fuel, multiphase superfine atomized residue, asphaltenes, petcoke, coal and combinations thereof.

4. The method as set forth in claim 1, wherein said fuel is combusted in a steam generator with oxygen and air.

5. The method as set forth in claim 1, further including the step of modifying said flue gas prior to injection into said formation.

6. The method as set forth in claim 5, including removing byproduct gas generated during said step of modifying.

7. The method as set forth in claim 6, wherein said byproduct gas includes at least one of hydrogen, carbon monoxide, nitrogen, nitrogen oxides, sulfur oxides, and carbon dioxide.

8. The method as set forth in claim 5, including removing particulate ash.

9. The method as set forth in claim 5, wherein said step of modifying said flue gas comprises unit operations including departiculation, quenching, compression and dehydration.

10. The method as set forth in claim 5, wherein modified flue gas is injected into said formation for repressurizing said formation and releasing natural gas within said formation.

11. The method as set forth in claim 10, wherein heavy oil is displaced from said formation during repressurization.

12. The method as set forth in claim 11, further including the step of modifying said displaced heavy oil with upgrading unit operations.

13. The method as set forth in claim 12, wherein said upgrading unit operations includes water removal from oil displaced from said formation.

14. The method as set forth in claim 13, wherein at least a portion of removed water is recirculated into said steam generator.

15. The method as set forth in claim 12, wherein at least a portion of the residuum from the upgraded heavy oil is converted to a multiphase superfine atomized residue for use as a combustion fuel.

16. A method for recovering gas and bitumen from at least one of a steam assisted gravity drainage formation containing gas over bitumen within the volume of said formation and from a geographically proximate formation, comprising;
   providing a flue gas recirculation circuit to produce modified flue gas;
   injecting said modified flue gas within said volume at a pressure sufficient to displace said gas over said bitumen and to displace said bitumen from within said formation;
   recovering displaced gas and bitumen; and
   repressurizing or maintaining the pressure of said volume with said modified flue gas to a pressure substantially similar to a pressure prior to injection of said modified flue gas.

17. The method as set forth in claim 16, wherein said displaced gas comprises natural gas not in direct geological contact with the bitumen.

18. The method as set forth in claim 16, further including the step of forming a composition of said modified flue gas for maximizing the volume of displaced gas.

19. The method as set forth in claim 18, wherein said step of forming a composition of said modified flue gas includes maintaining an oxygen concentration in said modified flue gas selected from the group consisting of excess, stoichiometric and sub stoichiometric.

20. The method as set forth in claim 18, wherein said composition of said modified flue gas comprises between 0% and 79% by volume nitrogen.

21. The method as set forth in claim 16, wherein subsequent to displaced gas recovery, modified flue gas injection continues to a pressure substantially similar to original geological pressures for sequestering of green house gases GHG.

22. The method as set forth in claim 16, wherein said flue gas recirculation circuit is fueled with a hydrocarbon fuel selected from the group consisting of natural gas, fuel oil, heavy oil, bitumen, residuum, vacuum residuum, emulsified fuel, multiphase superfine atomized residue, asphaltenes, petcoke, coal and combinations thereof.

23. A method for recovering gas and bitumen from at least one of a steam assisted gravity drainage formation containing gas over bitumen within the volume of said formation and from a geographically proximate formation, comprising;
   a steam generation phase for generating steam for injection into said formation;
   a flue gas recirculation phase for modifying flue gas for injection into said formation;
   an injection phase for injecting modified flue gas into said formation for displacing gas over said bitumen and maintaining the pressure of or repressurizing said formation; and
   a processing phase for processing produced displaced gas and liquid liberated from said injection phase.

24. A method for recovering heavy oil and bitumen from a subterranean formation containing heavy oil and bitumen, comprising:
   providing a fuel;
   burning said fuel in a flue gas recirculation circuit to produce a flue gas for injection into said formation;
   modifying said flue gas prior to injection
   injecting modified flue gas into said formation to repressurize said formation while releasing natural gas and heavy oil therefrom;
   upgrading recovered heavy oil; and
   converting at least a portion of residuum to multiphase superfine atomized residue for use as a fuel.

25. A method for recovering gas and bitumen from at least one of a steam assisted gravity drainage formation containing gas over bitumen within the volume of said formation and from a geographically proximate formation, comprising;
   providing a flue gas recirculation circuit to produce modified flue gas;
   generating by-product gas from said modified flue gas;
   injecting said modified flue gas within said volume at a pressure sufficient to displace said gas over said bitumen and to displace said bitumen from within said formation;
   recovering displaced gas and bitumen; and
   repressurizing or maintaining the pressure of said volume with said modified flue gas to a pressure substantially similar to a pressure prior to injection of said modified flue gas.

26. The method as set forth in claim 25, wherein said byproduct gas includes one of hydrogen, carbon monoxide, nitrogen oxides, sulfur oxides and carbon dioxide.

* * * * *